UNITED STATES PATENT OFFICE.

CARL RACH, OF CHICAGO, ILLINOIS.

PROCESS OF MAKING BEER.

SPECIFICATION forming part of Letters Patent No. 492,052, dated February 21, 1893.

Application filed February 5, 1892. Serial No. 420,397. (No specimens.)

*To all whom it may concern:*

Be it known that I, CARL RACH, a subject of the King of Prussia, residing at Chicago, Cook county, Illinois, have invented a new and useful Improvement in the Process of Making Beer, set forth in the annexed specification.

My invention relates to the manufacture of beer or the processes of producing the same and has for its object to produce a beer rich in extracts of malt and a beer rich in extracts of malt of diastasic properties and a beer relatively poor in alcohol. I accomplish these results by the process herein described and claimed.

I first take a certain quantity of wort which may have been produced in any desired manner the same being a concentrated wort of say 18° Balling. This wort should be concentrated to say 20° Balling or even more, the idea being to secure a highly concentrated wort either directly from the mashing process or by subsequently concentrating somewhat the most highly concentrated wort derived from the mashing process. This concentration should take place in a vacuum kettle and at a relatively low temperature so as to preserve the diastasic properties of the wort. I now take this concentrated wort and I may for convenience divide it into say three portions. One quarter of it is filtered and changed into a perfectly clear liquid wort highly concentrated; one quarter is filtered and preferably taken into a vacuum kettle and stirred and evaporated to dryness. This will therefore give me a highly concentrated clear liquid, diastasic wort, or a dry concentrated wort in the form of diastasic malt extract. Of course I may instead of making one quarter into clear concentrated liquid wort and the other quarter into a dry extract make the entire half or other portion as may be desired into a clear wort or into a dry extract. The remaining wort is boiled with hops, cooled off and stored in a cool storage house and is then kraeusen wort and is used afterward as so called kraeusen beer. I now take all the weaker worts obtained from the mash material and collect them in the beer mash kettle where this wort is boiled with hops and concentrated to about 8° Balling and is then cooled off when it becomes a regular beer wort. To this beer wort yeast is added whereupon it ferments and the fermented beer is stored in the vats until it reaches the desired ripeness so-called. This beer is then taken to the chip cask in the usual manner and for the usual purpose. I now add yeast to the concentrated strong kraeusen wort above referred to and convert it into kraeusen beer. I may now combine say ninety parts of the beer in the chip cask with ten parts of the kraeusen beer and the mixture is subjected to the usual cellar treatment. When the beer is ready for racking off it may be combined with any desired percentage of the concentrated diastasic wort, in either the form of the clear liquid concentrated diastasic wort or dry diastasic extract of wort or both as desired and the mixture of combining is accomplshed in any desired manner.

The proportion of parts as hereinbefore set out are not material but only cited as illustrative of my process.

To briefly and generally explain I take the concentrated wort as derived from the mashing processes and use it subsequently either as a kraeusen beer or as a concentrated diastasic wort or as a dry diastasic malt extract or in two or more such forms, in combination with a beer derived in substantially the usual manner from the weaker and thinner worts which are derived from the same mashing process.

In some cases a good beer is made by simply adding to the light beer made from the thin worts dry diastasic malt extracts. The manner in which the kraeusen is obtained is an important part of my process, as the same is sometimes used because the process consists in supporting thick and thin worts of one brew, and then successively treating them so as to produce the desired kind of beer. The concentrated wort may be used alone in the further process or a portion of it may be still further concentrated and such concentrated wort may itself in whole or in part be further concentrated or reduced substantially to a dry malt extract and some or all of such products so produced may be used in connection with the light worts as set forth.

I have used in this specification the term "concentrated wort" in a generic sense, meaning thereby to include a wort whether concentrated to dryness, or to a less degree so that it maintains its liquid condition. I believe that I am the first to add to a beer, low in alcohol, a concentrated diastasic wort, whether in a dry or in a liquid form, and therefore I do not wish that my invention should be considered as being limited to the particular process which, for the sake of illustration, I have described, although such process is the one I prefer to make use of in carrying out my invention.

I claim—

1. The process of manufacturing beer herein described which consists in concentrating wort derived from a mashing process without destroying the diastase, making a beer low in alcohol, and then mixing such concentrated wort and said beer in suitable proportions at about the time of racking off.

2. The process of manufacturing beer herein described which consists in concentrating wort derived from a mashing process without destroying the diastase, making a kraeusen beer, making a beer low in alcohol, adding the kraeusen beer to the said beer low in alcohol, and then adding to such mixture the concentrated wort still diastasic at about the time of racking off.

3. The process of manufacturing beer herein described which consists in concentrating wort still diastasic to a condition of dryness without destroying the diastase whereby it becomes a dry diastasic malt extract, making a beer low in alcohol, adding to such beer kraeusen beer, and then adding to such mixture a proper proportion of the said dry diastasic malt extract at about the time of racking off the beer.

4. The process of making beer herein described which consists in taking the stronger worts from a mash, concentrating them while still diastasic, taking the weaker worts from the same mash and making therefrom a beer low in alcohol, adding a kraeusen beer to the said beer, and then adding to the beer the aforesaid concentrated worts in suitable quantities at about the time of racking off.

5. The process of making beer herein described which consists in taking the richer worts derived from a mashing process and converting a portion thereof into kraeusen beer, and another portion into a concentrated diastasic wort, then taking the thinner worts derived from the same mashing process and making therefrom a beer low in alcohol, then mixing suitable quantities of such beer and kraeusen beer, then adding to the compound suitable quantities of the concentrated diastasic wort at about the time of racking off.

CARL RACH.

Witnesses:
LAURA WILLEY,
WALTER J. GUNTHORP.